(12) United States Patent
Giertz

(10) Patent No.: US 9,957,952 B2
(45) Date of Patent: May 1, 2018

(54) METHOD FOR OPERATING A WIND TURBINE

(71) Applicant: Wobben Properties GmbH, Aurich (DE)

(72) Inventor: Helge Giertz, Leer (DE)

(73) Assignee: Wobben Properties GmbH, Aurich (DE)

( * ) Notice: Subject to any disclaimer, the term of this patent is extended or adjusted under 35 U.S.C. 154(b) by 0 days. days.

(21) Appl. No.: 15/034,145

(22) PCT Filed: Sep. 26, 2014

(86) PCT No.: PCT/EP2014/070683
§ 371 (c)(1),
(2) Date: May 3, 2016

(87) PCT Pub. No.: WO2015/067408
PCT Pub. Date: May 14, 2015

(65) Prior Publication Data
US 2016/0273520 A1    Sep. 22, 2016

(30) Foreign Application Priority Data
Nov. 5, 2013    (DE) .......................... 10 2013 222 452

(51) Int. Cl.
*F03D 9/00*    (2016.01)
*H02P 9/04*    (2006.01)
(Continued)

(52) U.S. Cl.
CPC .............. *F03D 9/005* (2013.01); *F03D 7/00* (2013.01); *F03D 7/0284* (2013.01); *F03D 9/255* (2017.02); *F03D 9/257* (2017.02); *F03D 80/40* (2016.05); *H02J 3/386* (2013.01); *Y02E 10/723* (2013.01); *Y02E 10/725* (2013.01); *Y02E 10/763* (2013.01)

(58) Field of Classification Search
USPC ...................................................... 290/44, 55
See application file for complete search history.

(56) References Cited

U.S. PATENT DOCUMENTS

| 6,445,089 B1 * | 9/2002 | Okui ....................... H02J 9/062 307/66 |
| 6,784,564 B1 | 8/2004 | Wobben |

(Continued)

FOREIGN PATENT DOCUMENTS

| CN | 101142731 A | 3/2008 |
| CN | 101228351 A | 7/2008 |

(Continued)

*Primary Examiner* — Pedro J Cuevas
(74) *Attorney, Agent, or Firm* — Seed IP Law Group LLP

(57) ABSTRACT

A method for controlling at least one wind turbine, wherein the at least one wind turbine is set up to feed electrical power into an electrical power grid, and, depending on an amount of power of the electrical power grid, electrical active power is fed into the electrical power grid or electrical active power is removed from the electrical power grid and is supplied to at least one electrical consumer of the at least one wind turbine, and, depending on a further state variable of the electrical power grid, electrical reactive power is fed into the electrical power grid or electrical reactive power is removed from the electrical power grid.

9 Claims, 3 Drawing Sheets

(51) Int. Cl.
*H02J 3/38* (2006.01)
*F03D 7/02* (2006.01)
*F03D 80/40* (2016.01)
*F03D 7/00* (2006.01)
*F03D 9/25* (2016.01)

(56) References Cited

U.S. PATENT DOCUMENTS

| | | | |
|---|---|---|---|
| 6,891,281 B2 | 5/2005 | Wobben | |
| 6,924,565 B2 | 8/2005 | Wilkins et al. | |
| 6,965,174 B2 | 11/2005 | Wobben | |
| 7,197,378 B2* | 3/2007 | Sato | G06Q 50/06 700/286 |
| 7,397,143 B2 | 7/2008 | Walling | |
| 7,741,728 B2* | 6/2010 | Fortmann | H02J 3/1885 290/44 |
| 7,908,036 B2* | 3/2011 | Kirchner | F03D 7/0284 307/46 |
| 7,952,214 B2* | 5/2011 | Ichinose | H02P 9/10 290/44 |
| 7,983,799 B2* | 7/2011 | Bose | H02J 3/06 700/287 |
| 8,049,352 B2 | 11/2011 | Jørgensen et al. | |
| 8,084,874 B2 | 12/2011 | Llorente González | |
| 8,242,753 B2 | 8/2012 | Engelhardt et al. | |
| 8,312,733 B2 | 11/2012 | Tsarev et al. | |
| 8,395,360 B2* | 3/2013 | Tripathi | F03D 7/0272 290/44 |
| 8,692,419 B2* | 4/2014 | Fortmann | H02J 3/1885 307/153 |
| 8,698,461 B2 | 4/2014 | Engelhardt et al. | |
| 8,779,610 B2 | 7/2014 | Luetze | |
| 8,934,270 B2* | 1/2015 | Letas | H02J 3/1892 290/44 |
| 8,957,536 B2 | 2/2015 | Gupta et al. | |
| 8,981,708 B2* | 3/2015 | Diedrichs | B60L 11/1824 307/82 |
| 8,994,202 B2 | 3/2015 | Gupta et al. | |
| 9,106,152 B2* | 8/2015 | De Brabandere | H02J 3/383 |
| 9,166,509 B2* | 10/2015 | Egedal | H02J 3/16 |
| 9,209,711 B2* | 12/2015 | Farkas | H02J 3/32 |
| 9,461,572 B2* | 10/2016 | Wessels | H02J 3/1885 |
| 9,509,141 B2* | 11/2016 | Egedal | F03D 7/026 |
| 9,677,544 B2* | 6/2017 | Li | F03D 9/257 |
| 9,705,334 B2* | 7/2017 | Giertz | H02J 3/40 |
| 2002/0036911 A1* | 3/2002 | Okui | H02J 9/062 363/95 |
| 2004/0207264 A1* | 10/2004 | Sato | G06Q 50/06 307/11 |
| 2005/0040655 A1* | 2/2005 | Wilkins | F03D 7/02 290/44 |
| 2008/0143304 A1* | 6/2008 | Bose | H02J 3/06 323/205 |
| 2008/0239770 A1 | 10/2008 | Punzet et al. | |
| 2008/0252076 A1* | 10/2008 | Fortmann | H02J 3/1885 290/44 |
| 2008/0252143 A1 | 10/2008 | Gonzalez et al. | |
| 2008/0296898 A1* | 12/2008 | Ichinose | H02P 9/10 290/44 |
| 2009/0206603 A1* | 8/2009 | Llorente Gonzalez | F03D 7/0224 290/44 |
| 2010/0138058 A1* | 6/2010 | Kirchner | F03D 7/0284 700/286 |
| 2010/0298991 A1* | 11/2010 | Alonso Sadaba | F03D 7/0272 700/276 |
| 2010/0332042 A1 | 12/2010 | Riesberg et al. | |
| 2012/0061959 A1* | 3/2012 | Yasugi | H02P 9/10 290/44 |
| 2012/0261917 A1* | 10/2012 | Egedal | F03D 7/026 290/44 |
| 2012/0268081 A1* | 10/2012 | Tripathi | F03D 7/0272 322/28 |
| 2013/0015660 A1* | 1/2013 | Hesselbæk | H02J 3/16 290/44 |
| 2013/0043825 A1* | 2/2013 | Diedrichs | B60L 11/1824 320/101 |
| 2013/0141951 A1* | 6/2013 | Adloff | H02J 3/26 363/71 |
| 2013/0147442 A1* | 6/2013 | Tripathi | F03D 7/0272 322/89 |
| 2013/0170254 A1* | 7/2013 | Letas | H02J 3/1892 363/34 |
| 2013/0182477 A1* | 7/2013 | De Brabandere | H02J 3/383 363/95 |
| 2013/0221934 A1 | 8/2013 | Wakasa et al. | |
| 2013/0249215 A1* | 9/2013 | Egedal | H02J 3/16 290/44 |
| 2013/0300116 A1* | 11/2013 | Egedal | F03D 7/026 290/44 |
| 2014/0084587 A1* | 3/2014 | Beekmann | F03D 7/0276 290/44 |
| 2014/0225446 A1* | 8/2014 | Giertz | H02J 3/40 307/84 |
| 2014/0362623 A1* | 12/2014 | Farkas | H02J 3/32 363/97 |
| 2015/0124496 A1* | 5/2015 | Yu | H02M 1/36 363/35 |
| 2015/0198145 A1* | 7/2015 | Diedrichs | F03D 7/04 700/287 |
| 2015/0280629 A1* | 10/2015 | Diedrichs | H02J 3/24 290/44 |
| 2015/0365031 A1* | 12/2015 | Wessels | H02J 3/1885 290/44 |
| 2016/0084892 A1* | 3/2016 | Nielsen | G01R 21/00 702/61 |
| 2016/0087445 A1* | 3/2016 | Beekmann | H02J 3/386 307/52 |
| 2016/0134121 A1* | 5/2016 | Bartsch | F03D 7/0284 307/52 |
| 2016/0161538 A1* | 6/2016 | Wang | G06F 17/5009 324/113 |
| 2016/0173017 A1* | 6/2016 | Beekmann | H02J 3/386 290/44 |
| 2016/0226258 A1* | 8/2016 | Giertz | H02J 3/14 |
| 2016/0273520 A1* | 9/2016 | Giertz | H02J 3/386 |
| 2017/0074244 A1* | 3/2017 | Huang | H02J 3/386 |
| 2017/0077711 A1* | 3/2017 | Oesselke | H02J 3/18 |
| 2017/0234299 A1* | 8/2017 | Kjær et al. | F03D 7/0284 290/44 |

FOREIGN PATENT DOCUMENTS

| | | | | |
|---|---|---|---|---|
| CN | 101467343 A | 6/2009 | | |
| CN | 102150356 A | 8/2011 | | |
| DE | 102006027465 A1 | 12/2007 | | |
| DE | 102005049426 B4 | 12/2009 | | |
| DE | 102008037449 B4 | 10/2010 | | |
| DE | 102011007037 A1 | 1/2012 | | |
| DE | 102005041927 B4 | 2/2013 | | |
| EP | 1775819 A2 | 4/2007 | | |
| EP | 2187048 A1 | 5/2010 | | |
| JP | 04325832 A | * 11/1992 | | H02J 3/28 |
| KR | 10-2013-0085830 A | 7/2013 | | |
| RU | 2221165 C2 | 1/2004 | | |
| WO | 00/74198 A1 | 12/2000 | | |
| WO | 03058063 A1 | 7/2003 | | |
| WO | 2009083445 A1 | 7/2009 | | |
| WO | 2012000508 A2 | 1/2012 | | |
| WO | 2012076015 A2 | 6/2012 | | |

\* cited by examiner

METHOD FOR OPERATING A WIND TURBINE

BACKGROUND

Technical Field

The present invention relates to a method for operating at least one wind turbine. In addition, the present invention relates to a wind turbine and also relates to a wind farm comprising a number of wind turbines.

Description of the Related Art

Wind turbines are generally known. They produce electrical energy from wind and feed the electrical energy into an electric power grid. In addition, it was already proposed many years ago for wind turbines to feed into the electrical power grid such that they also support the electrical power grid beyond the pure provision of energy.

By way of example, U.S. Pat. No. 6,784,564 describes a method in which the fed active power is reduced in accordance with the grid voltage. A method that concerns a power regulation dependent on the grid frequency can be inferred from U.S. Pat. No. 6,891,281. The setting of a phase angle in accordance with the grid voltage is described in U.S. Pat. No. 6,965,174.

Such measures are important and, in particular in decentralized grids, may help improve the grid quality and sometimes even enable for the first time a stable operation of the electrical power grid or at least a portion thereof or ensure this permanently. Nowadays, however, at least in the Federal Republic of Germany, which will surely be followed by many other countries, the proportion of wind turbines in the grid is increasing. A great, and in all likelihood growing, responsibility will thus also be bestowed in the future upon wind turbines for the stabilization of electrical power grids. The ability of wind turbines to support the grid must therefore be developed and improved further where possible.

BRIEF SUMMARY

One or more embodiments provide support of an electrical power grid by wind turbines. At the very least, a solution alternative to known methods or systems is to be proposed.

The German Patent and Trademark Office has performed a search of the following prior art for the priority application relating to the present PCT application: DE 10 2005 041 927 B4, DE 10 2005 049 426 B4, DE 10 2008 037 449 B4, DE 10 2011 007 037 A1 and WO 2003/058 063 A1. A method is proposed. The method controls at least one wind turbine, which is set up to feed electrical power into an electrical power grid. Where technically expedient, explanations in conjunction with an individual wind turbine also apply to a number of wind turbines as well as a wind farm comprising a number of wind turbines, even without this being mentioned together with each individual feature and in each individual advantage. This is then true in particular when it is clear from the explanation that this is also applicable for wind turbines or a wind farm.

It is thus proposed for the at least one wind turbine to feed electrical active power into the electrical power grid or to remove electrical active power from the electrical power grid in a manner dependent on a supply of power in the electrical power grid. In particular, in "normal operation", electrical active power is fed into the electrical power grid, but, in the case of an excess supply of power in the grid, electrical active power is removed from the grid by the at least one wind turbine. This removed active power is then fed to at least one electrical load, which is present in the at least one wind turbine or a wind farm. This load does not necessarily have to be arranged physically in the wind turbine, although this is often the case. Here, it is proposed in particular to use existing loads.

In addition, electrical reactive power is fed into or removed from the electrical power grid depending on a further state variable of the electrical power grid, such as the grid frequency or the grid voltage of the electrical power grid.

A "4-quadrant operation" is thus proposed, therefore specifically both the fed active power and the fed reactive power can be positive or negative independently of one another. The proposed method thus expressly also includes the two quadrants in which electrical active power is removed from the electrical power grid and reactive power is fed in, which constitutes one quadrant, and in which electrical active power is removed from the electrical power grid and reactive power is likewise removed, which constitutes a further quadrant.

At least one of the electrical loads preferably has no electrical resistor banks. Thus, at least one load is preferably used that is not provided exclusively as a resistor bank or the like in order to destroy electrical energy, that is to say, expressed technically correctly, in order to convert electrical energy into thermal energy without further purpose. Rather, it is proposed to use loads that are provided anyway in a wind turbine or a wind farm. Thus, progress can be achieved already by the proposed method alone for operating at least one wind turbine, without the need to provide additional apparatuses.

The electrical load(s) used to take up the electrical power which in one case is removed from the electrical power grid may comprise, for example, a blade heater (see BH in FIG. 1) for heating a rotor blade. Likewise, a generator heater (see GH in FIG. 1) for heating a generator can be used. As a further example, a nacelle heater (see NH in FIG. 1) is mentioned, which can heat the interior of a nacelle of a wind turbine. Furthermore, a tower heater (see TH in FIG. 1) for heating a wind turbine tower is conceivable. Particularly, the use of existing heaters or heating devices enables the conversion of a not insignificant quantity of electrical energy into thermal energy, which can be radiated to the surrounding environment.

Nonetheless, however, other loads are also considered, such as the generator of the respective wind turbine, which can be operated in motor operation. Some of the energy could thus be converted into air movement. In principle, however, it is also conceivable here to operate the generator such that it heats up and in this regard is used as a further load in order to convert electrical energy into thermal energy. Nonetheless, this must be performed carefully accordingly so as not to damage the generator.

In particular, it is proposed for the loads to then be operated when there is a need for a power decrease. The aforementioned loads, which are also to be used here, are each provided in order to perform a certain function, specifically the load function associated therewith respectively. In the case of the blade heater, this is the function of heating the blade. In the case of the generator heater, this is the function of heating the generator and also thus drying the generator where applicable. This respective load function is usually performed only on specific occasions, that is to say a blade heater is then operated particularly when icing has been identified and the ice is to be thawed. Here, however, it is proposed to operate the corresponding load independently of the need for such a load function, that is to say for example to also operate the blade heater at the height of summer.

Accordingly, it is also proposed in accordance with one embodiment to use the electrical power removed from the electrical power grid to operate at least one de-icing device, in particular a blade heater, independently of whether there is a need for de-icing. In particular, independently of whether icing is present, is expected or is even possible. The de-icing device is thus also operated at the height of summer. Wind turbines are preferably equipped with a de-icing device even for locations in which icing is never expected per se.

In addition or alternatively, it is proposed to use the removed power or a portion thereof to operate at least one drying device for drying a generator or for drying another functional unit of the wind turbine, independently of whether there is a need for drying. A generator heater provided anyway or other drying arrangement can thus be used as a load in this case of power removal from the electrical power grid.

The supply of power in the electrical power grid can be considered as a state variable of the electrical power grid. The further state variables, in accordance with which reactive power is fed or removed, preferably include the grid frequency of the electrical power grid 122 and/or the grid voltage 124 of the electrical power grid (see FIG. 2). In accordance with these embodiments, the feed or removal of electrical active power is thus set depending on the supply of power, and the feed or removal of reactive power is performed depending on grid frequency and/or grid voltage. Here, the grid-frequency-dependent and/or grid-voltage-dependent feed or removal of reactive power can depend both qualitatively and quantitatively on the aforementioned state variables. Both the level of reactive power and a dynamic rise or drop can be dependent on the aforementioned grid state variables.

Likewise, the level and/or the behavior of the grid state variables can be considered as criteria.

The method preferably uses a frequency inverter in order to feed or remove the active power and the reactive power into/from the electrical power grid. It is hereby possible to decouple this feed or removal operation completely from the functioning of the wind turbine, in particular of the generator. Any plant controller, with adapted specifications, can initially continue to be operated in an unchanged manner. Of course, the controller then adapts the operation of the wind turbine, where applicable, when less power is required or when the power is even negative. However, the immediate response when feeding or removing active power and/or reactive power can be implemented initially independently of the frequency converter.

The wind turbine or all concerned wind turbines is/are preferably operated in what is known as full converter operation. In the case of this full converter operation, in order to explain this for the normal generation operation, the total energy of the generator removed by said generator from the wind is rectified and transferred into a corresponding DC intermediate circuit. From this DC intermediate circuit, the frequency inverter or a number of frequency inverters cooperating accordingly produces/produce the power to be fed, that is to say the current to be fed, in accordance with frequency, phase and amplitude.

During operation of the power removal, this frequency inverter, which is also referred to just as an inverter for simplification, can introduce power or energy from the electrical power grid into the DC intermediate circuit. Appropriate energy can then be removed from the relevant loads by this DC intermediate circuit. Indeed, there is advantageously a command signal for removing such power at relevant loads from a central point in the wind turbine or even in the wind farm, however the subsequent implementation is performed by the respective load. Lastly, the relevant load also otherwise operates independently, specifically when it is not used for power consumption, but for regular operation of the load function thereof.

In the case of the proposed method, a number of wind turbines are preferably used, which form a wind farm and feed into the electrical power grid via a grid point of common coupling. The aforementioned effects and the aforementioned behavior can be combined as a result. Such a wind farm, which feeds into the grid point of common coupling, thus also regularly has a significant quantity in terms of the amount of feedable and removable power (both reactive power and active power) compared with an individual wind turbine. Such a wind farm is thus preferably operated in the described 4-quadrant operation and thus constitutes a significant quantity from the viewpoint of the electrical power grid, not only for the provision of energy, but also for the potential of the controllability. It can cater in a significant measure to the supply of power, inclusive of the usual power demand. Inter alia, it can thus also favorably influence situations in which, in the past, payment of a sum would have been necessary in order to remove power in certain cases.

A wind turbine is preferably proposed which is set up to use a method according to at least one of the above-described embodiments.

More preferably, a wind farm is proposed that uses a number of wind turbines and is set up to use a method according to at least one above-described embodiment.

Such a wind farm preferably has a central controller for controlling the wind turbines, which also controls the described 4-quadrant operation, such that the wind farm can act at the grid coupling point as an efficient feed and control unit.

BRIEF DESCRIPTION OF THE SEVERAL VIEWS OF THE DRAWINGS

The invention will be explained in greater detail hereinafter by way of example with reference to the accompanying figures.

DETAILED DESCRIPTION

Figure 1:
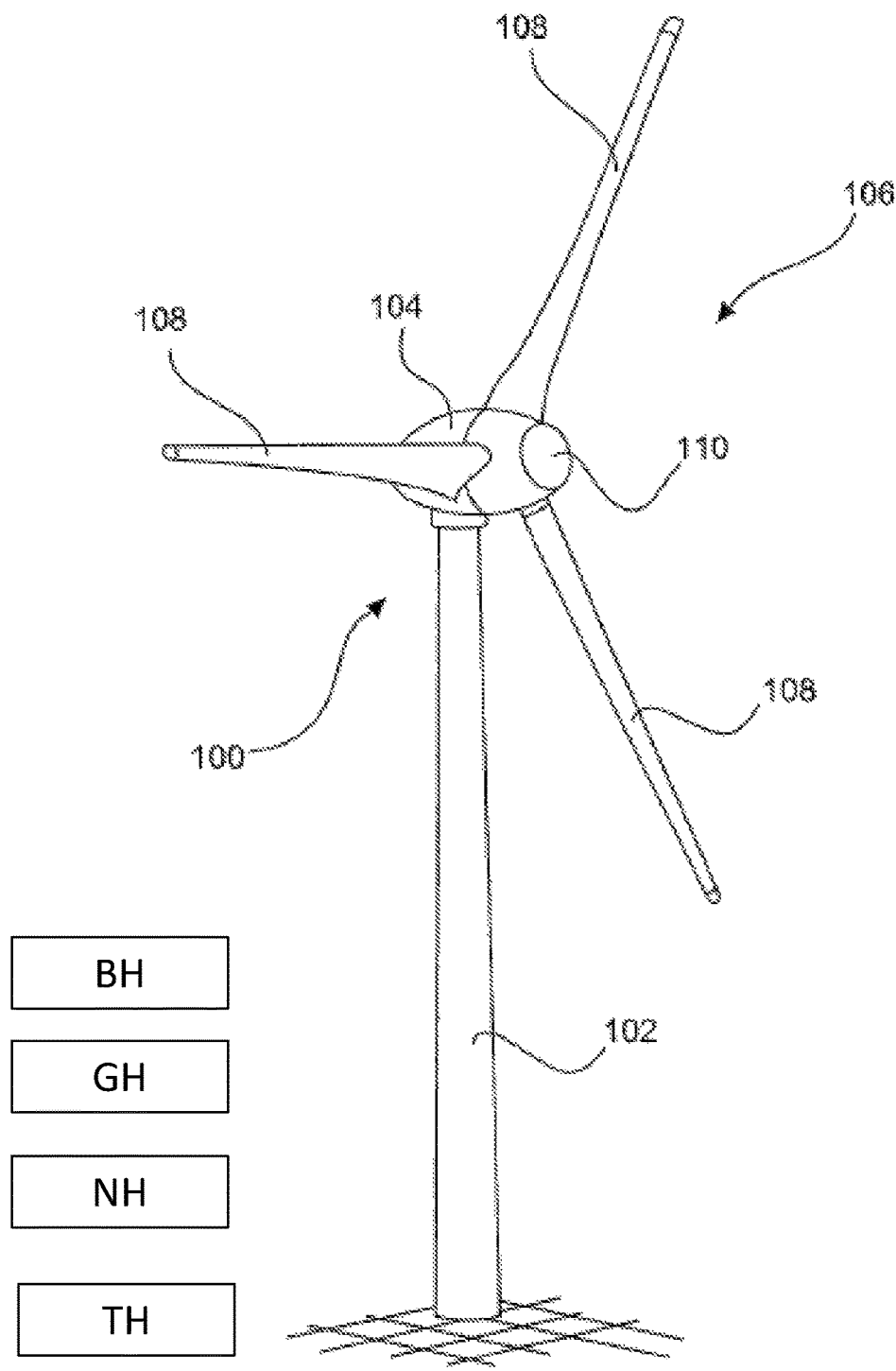
FIG. 1 schematically shows a wind turbine in a perspective view.

FIG. 1 shows a wind turbine 100 with a tower 102 and a nacelle 104. A rotor 106 having three rotor blades 108 and a spinner 110 is arranged on the nacelle 104. During operation, the rotor 106 is set in a rotary motion by the wind and thus drives a generator in the nacelle 104.

Figure 2:
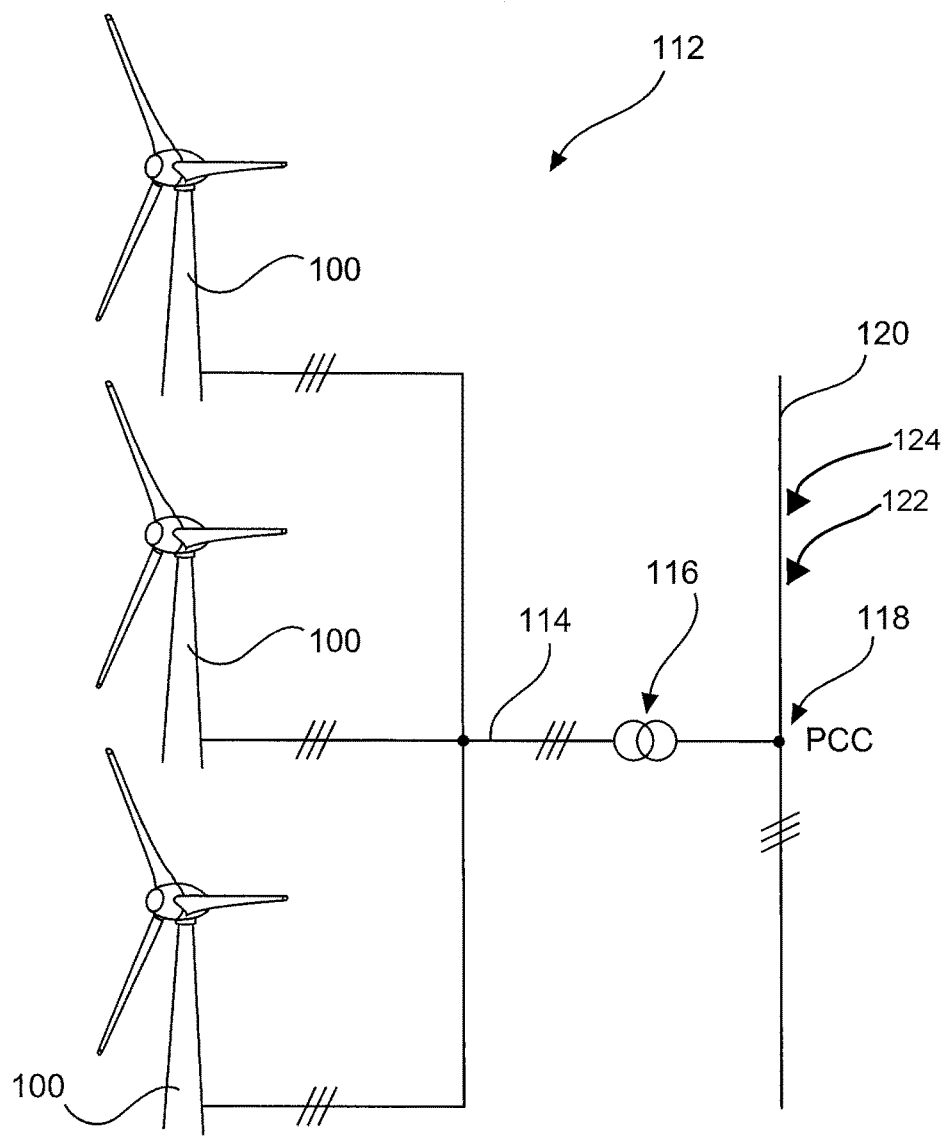
FIG. 2 schematically shows a wind farm.

FIG. 2 shows a wind farm 112 comprising, by way of example, three wind turbines 100, which may be the same or different. The three wind turbines 100 are thus representative of, in principle, any number of wind turbines of a wind farm 112. The wind turbines 100 provide their power, specifically in particular the produced current, via an electrical farm grid 114. Here, the produced currents or powers of the individual wind turbines 100 are added and a transformer 116 is usually provided, which performs an upward transformation of the voltage in the farm so as to then feed this into the power grid 120 at the feed point 118, which is also referred to generally as the grid point of common coupling or PCC for short. FIG. 2 is merely a simplified illustration of a wind farm 112, which for example does not show any controller, although a controller is of course provided. By way of example, the farm grid 114 can also be formed differently, in which for example a transformer is also provided at the output of each wind turbine 100, so as to specify just one other exemplary embodiment.

Figure 3:
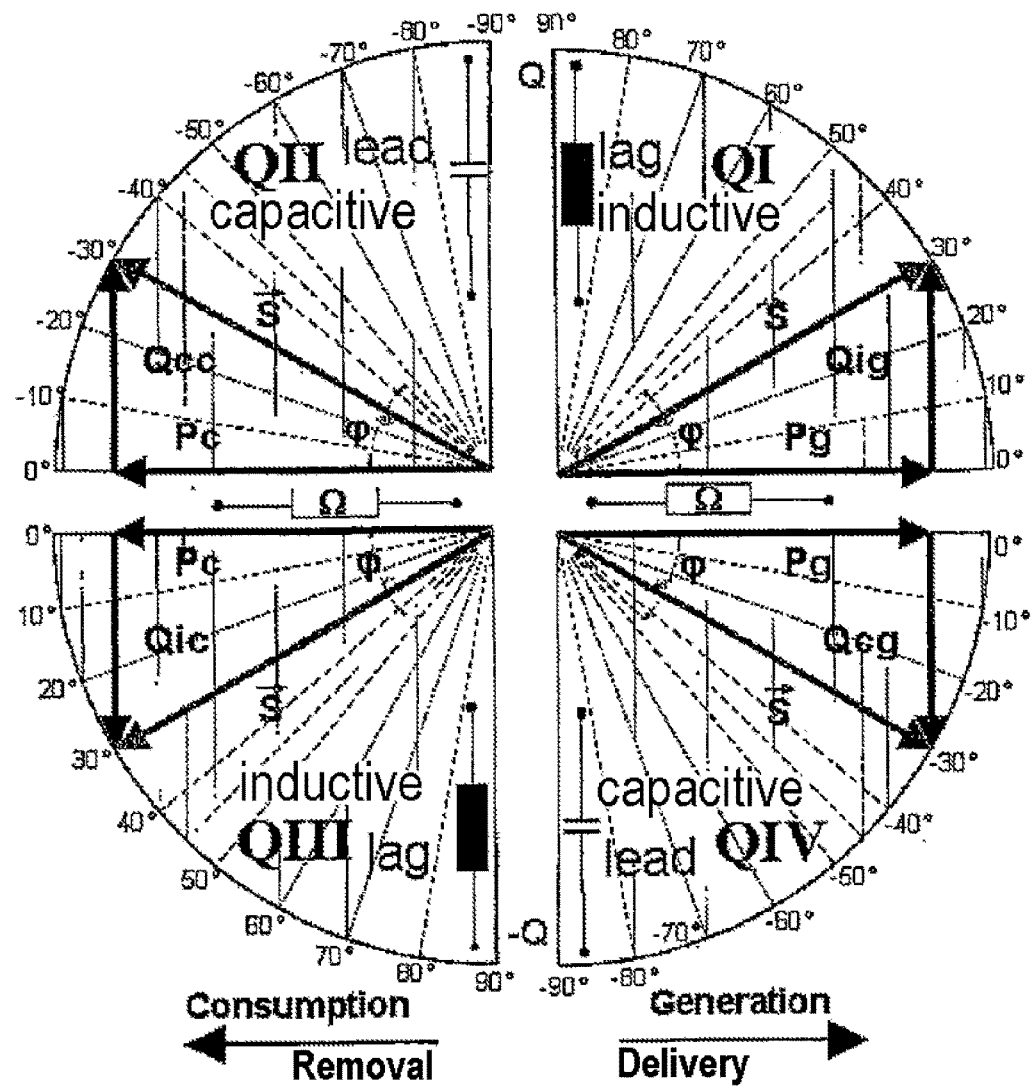
FIG. 3 illustrates the proposed 4-quadrant operation on the basis of a symbolic diagram.

FIG. 3 illustrates the proposed 4-quadrant drive in accordance with an illustration in the form of a diagram in the complex plane, which specifically represents active power in the abscissa direction and reactive power Q in the ordinate direction. In this diagram, the angle $\varphi$ is thus also plotted, which in this regard represents the phase angle between fed current and voltage. Here, the four regions each showing one quadrant are graphically shown separately from this diagram of the complex plane for the purpose of illustration, since a spacing is plotted in the region of the coordinate system. The diagram thus shows the four quadrants, which are denoted by QI to QIV. The four quadrants are named thus in this context, wherein Q otherwise denotes the reactive power.

The first quadrant QI according to FIG. 3 shows the case in which active power and reactive power are fed. The fed reactive power is referred to as Pg (generated power) and the reactive power is referred to as Qig (generated inductive reactive power). The fed active power Pg and the fed inductive reactive power Qig give the apparent power $\vec{S}$.

This first quadrant may also represent the normal feed case. So as to further illustrate that inductive reactive power is fed, which leads precisely to the vector diagram of Pg, Qig and $\vec{S}$, the symbol of an inductance is also shown in the first quadrant. Due to the term "lag" used by a person skilled in the art, which means the same as running behind, it is additionally indicated that in this operation the fed current lags behind the voltage, specifically precisely by the shown angle $\varphi$.

In the second quadrant QII, active power is removed from the electrical power grid, that is to say is consumed and not generated, which is indicated by the symbol Pc (power consumed). The reactive power component Qcc is positively illustrated. Since, however, active power is removed, the reactive power is also referred to here as removed (consumed), however is used as capacitive reactive power, which is why the naming Qcc is used. The current here runs ahead of the voltage, which is referred to here as "lead" and is illustrated by the symbol of the capacitance (of the capacitor) in the second quadrant QII.

The removed capacitive reactive power Qcc could at least theoretically also be referred to as produced inductive reactive power Qig, which from a technical viewpoint however would be confusing, at least in accordance with the selected illustration, because the leading current and accordingly the shown angle $\varphi$ denotes capacitive reactive power.

For the rest, two resistors are indicated parallel to the abscissa and thus symbolize the actual axis of this complex illustration.

In the third quadrant QIII, active power Pc is also removed, that is to say consumed. However, the proportion of reactive power Qic is negative here. Inductive reactive power is thus consumed and the current runs behind the voltage (lag), which is why the symbol of the shown inductance is also used again here.

The fourth quadrant QIV lastly shows the case that active power Pg is fed and (inductive) reactive power Qcg is removed, which corresponds to the feed (generation) of capacitive reactive power Qcg, such that the naming Qcg is selected, because here the current again runs ahead of the voltage. This is also illustrated here by the capacitance.

A solution is thus created that proposes a 4-quadrant operation of a wind turbine or of a wind farm and this behavior is illustrated by FIG. 3.

Here, the underlying reasoning is that, in the case of the energy revolution in Germany, wind energy is one of the central pillars, if not the central pillar. In terms of technical content, the proposals of course are not limited to Germany. By means of the solution presented here, topics such as direct marketing, control reserve and minute reserve are also taken into consideration and form components for constructing what are known as green power plants. It is proposed for the provided energy to be organized such that conventional power plants, in particular nuclear power plants, can be switched off. Nevertheless, it must be possible to create and operate a stable grid without these large and partially leading and grid-stabilizing power plants. It has been identified that a key point here is the load flow control in the distributor grid and also at a higher level in the transmission grid, which both form parts of the electrical power grid. This load flow control is a parameter for stability of the electric power grid.

A conventional power plant is generally designed to provide energy. The system service powers of such a conventional power plant are limited only to the provision of the required energy, supply of reactive power for voltage preservation and control of the load flow in the electric power grid. Such a power plant provides this service only during production operation (also referred to as "generation operation"), that is to say with the delivery of energy.

In the case of the specific proposed 4-quadrant power plant, that is to say in the case of the wind turbine or the wind farm which can be operated in 4-quadrant operation, it is also possible to provide system services during consuming operation ("consumption operation"), that is to say also when energy is drawn from the electrical power grid. To this end, the possibility of load flow control by the consumption of energy is proposed.

In addition to the feed reduction to 0, power can also be removed from the electrical power grid.

So as to name one example, reference is made to the fact that the North of Germany is very windy and therefore a lot of wind energy is provided in order to be fed into the electrical power grid, and therefore specifically also into the European integrated network. An excess supply hereby produced would significantly increase the load flow from North to South Germany, which could lead to problems in the integrated network. In order to control the load flow in the integrated network such that no problems can occur, numerous large loads (for example thermal loads) are connected in a controlled manner into the numerous distributed wind turbines in Germany. The loads could be generator heaters, blade heaters and generators operated in motor operation. Besides the regulated reference power, services such as reactive power for load flow control can also be introduced. This method may indeed have advantages in terms of a global energy balance, but also has an advantage in the numerous widely distributed actuators, specifically wind turbines, which can be activated and deactivated at relatively short notice. Processes in the grid can thus be responded to quickly, wherein the present invention additionally proposes this for the described 4-quadrant operation.

As a further example for illustration, reference is made to the fact that energy is traded on the spot market. There are times at which the current price can fall up to minus 3,000 euros/MWh. This regional excess supply of energy and the resultant negative price can now be controlled by reducing or even completely destroying in the regional wind turbines the excess energy responsible for such a described price behavior by switching on the large loads, in particular thermal loads.

The invention claimed is:

1. A method for controlling at least one wind turbine, the method comprising:
   configuring the at least one wind turbine to feed electrical power into an electrical power grid;
   if additional supply of the electrical power is needed in the electrical power grid, then feeding electrical active power from the at least one wind turbine into the electrical power grid; and
   if there is an excess supply of the electrical power in the electrical power grid, then using the at least one wind turbine to remove active power from the electrical power grid and to supply the removed active power to at least one electrical load of the at least one wind turbine; and
   depending on a state variable of the electrical power grid:
   feeding electrical reactive power from the at least one wind turbine into the electrical power grid; or
   removing the electrical reactive power from the electrical power grid, wherein the state variable includes a variable from a group of grid frequency of the electrical power grid and grid voltage of the electrical power grid.

2. The method according to claim 1, wherein the at least one electrical load is selected from the group comprising:
   a blade heater for heating a rotor blade,
   a generator heater for heating a generator,
   a nacelle heater for heating a nacelle,
   a tower heater for heating a wind turbine tower or a portion thereof, and
   a generator of the at least one wind turbine in motor operation.

3. The method according to claim 1, wherein:
   the at least one electrical load is configured to perform a load function; and
   the electrical active power removed from the electrical power grid is used to operate the at least one electrical load independently of whether there is a demand for the load function of the at least one electrical load.

4. The method according to claim 1, wherein the electrical active power removed from the electrical power grid is used to operate at least one of the following:
   at least one de-icing device independently of whether there is a need for de-icing; and
   at least one drying arrangement for drying a component of the wind turbine, independently of whether there is a need for drying the component.

5. The method according to claim 1, wherein feeding or removing the electrical active power and feeding and removing the electrical reactive power is performed by at least one frequency inverter.

6. The method according to claim 1, wherein the method includes controlling a plurality of wind turbines, wherein the plurality of wind turbines form a wind farm that feed into the electrical power grid via a grid point of common coupling.

7. A wind turbine comprising:
   means for configuring the wind turbine to feed electrical power into an electrical power grid;
   means for determining if an additional supply of electrical power is needed in the electrical power grid;
   means for determining if there is an excess supply of electrical power in the electrical power grid;
   means for feeding electrical active power into the electrical power grid;
   means for removing active power from the electrical power grid and supplying the removed active power to at least one electrical load of the at least one wind turbine;
   means for determining a state variable of the electrical power grid, the state variable being selected from: a grid frequency of the electrical power grid, and a grid voltage of the electrical power grid; and
   means for feeding electrical reactive power into the electrical power grid or removing electrical reactive power from the electrical power grid depending on a state of the state variable.

8. A wind farm comprising:
   a plurality of wind turbines, each configured to feed electrical active power and electrical reactive power into the electrical power grid via a grid point of common coupling using the method according to claim 1.

9. The wind farm according to claim 8, further comprising a central controller for controlling the plurality of wind turbines.

* * * * *